March 26, 1963    J. J. RENIER    3,082,624
CONDITION RESPONSIVE DEVICES
Filed Sept. 11, 1961
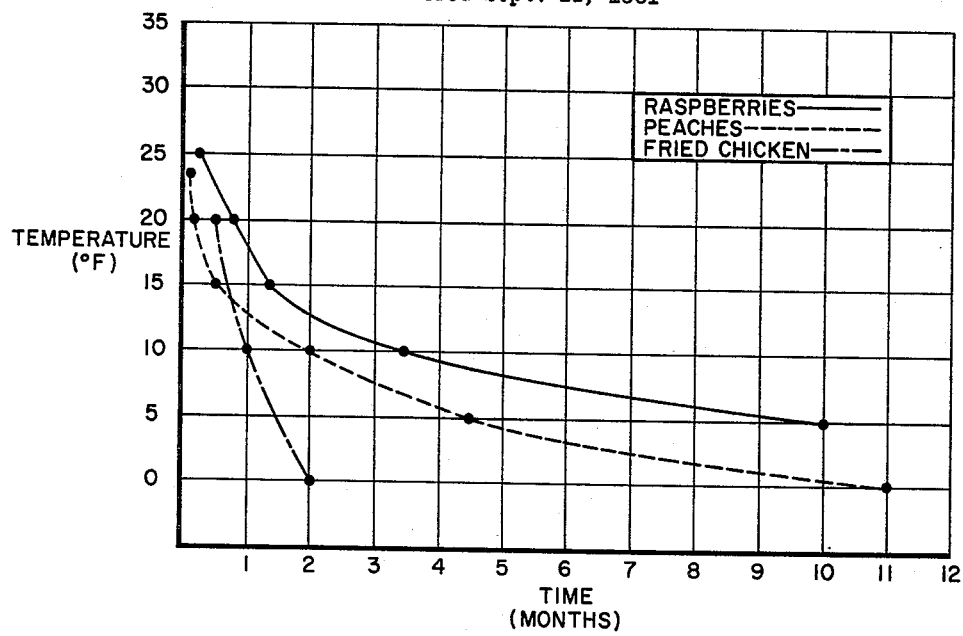
Fig 1
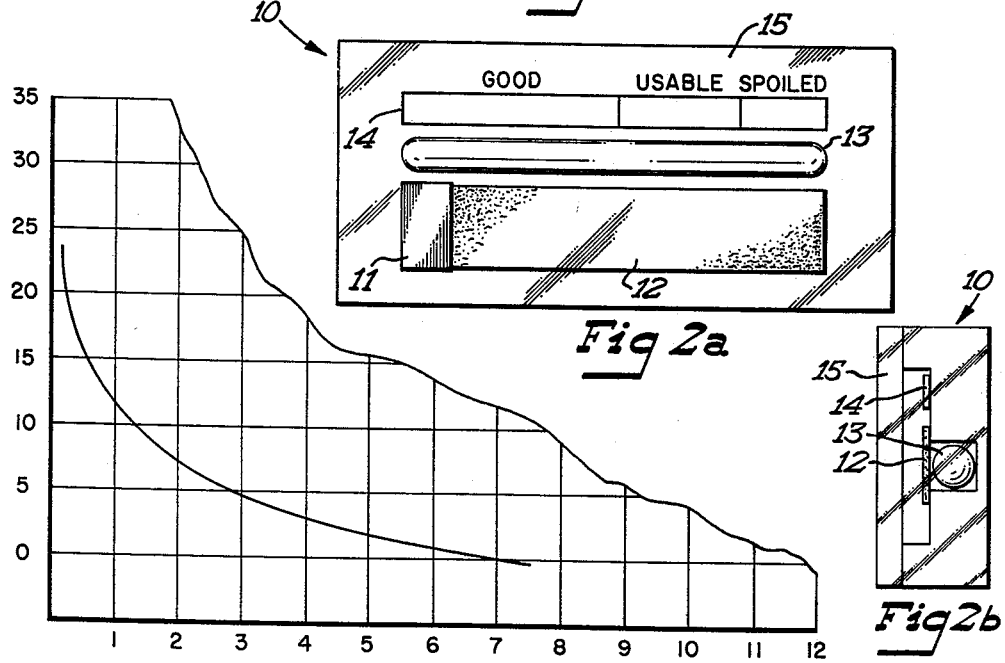
Fig 2a
Fig 2b
Fig 3
INVENTOR.
JAMES J. RENIER
BY Robert O. Vidas
ATTORNEY

United States Patent Office 3,082,624
Patented Mar. 26, 1963

3,082,624
CONDITION RESPONSIVE DEVICES
James J. Renier, Hopkins, Minn., assignor to Minneapolis-Honeywell Regulator Company, Minneapolis, Minn., a corporation of Delaware
Filed Sept. 11, 1961, Ser. No. 137,322
10 Claims. (Cl. 73—356)

The present invention is directed to a device for indicating the time-temperature history of an environment. More particularly it is directed to a device which provides a visual indication of an integrated time-temperature history of an article stored in the environment.

A cheap, reliable system for indicating the past temperature and time history of various materials has been the subject of much investigation and various systems have been proposed to provide such an indication. While electrical recorders can be coupled with a thermocouple to give such a history, this type of indication is both bulky and costly.

In the frozen foods industry various schemes have been proposed to provide a tell-tale to indicate whether a frozen food package has ever reached the melting point, and if so, for how long before being refrozen. One such device uses a wick of an absorbent material. The wick is immersed in a reservoir of an indicating substance which when solid does not migrate along the wick. Upon thawing, the indicator substance moves by capillary action along the wick and provides an indication of the length of time the substance has been in a liquid state. This type of system, while adequate for crude measurements of time only, does not provide time and temperature integrated indication.

It has been found that many substances deteriorate at varying rates dependent on the temperature. For example, studies published in "Food Technology" beginning at volume XI, No. 1, 1957, entitled "The Time Temperature Tolerance of Frozen Foods" have shown that a frozen food deteriorates even while in the frozen state, the rate being dependent on temperature. These studies published in "Food Technology" have shown that frozen foods such as peaches, raspberries and fried chicken will deteriorate in quality in line with the curves such as illustrated in FIGURE 1. In the figure the lines represent a specific state of deterioration with the time necessary to reach this state plotted against various storage temperatures. As can be seen, the rate of deterioration is quite rapid when in the non-frozen state, but is also sensible at temperatures below freezing. Accumulative time-temperature history is necessary to evaluate the quality of the product. Thus, under prolonged storage a simple indication of the time that an article of frozen food has been above freezing is inadequate to be used as a measure of the damage or deterioration in quality that may have occurred during prolonged storage at below freezing.

The present invention provides a cheap and accurate indication of time and temperature of storage of an article of food or the like. It should be understood that the present invention may be readily extended to temperatures other than that of below the freezing point of water. A time-temperature indication can be provided for systems above 32° F. by variation of the present system. The variations will be readily apparent to those skilled in the art.

The present invention will be best understood from a study of the following examples and drawings wherein:

FIGURE 1 is a plot of time versus temperature for deterioration of peaches, raspberries and fried chicken to a specific quality level;

FIGURE 2a is a plan view of a device in accordance with the present invention;

FIGURE 2b is an end view of a device in accordance with the present invention showing one modification for positioning the various elements;

FIGURE 3 is a plot of the extent of migration of the indicator substance as a function of time and temperature in a device of the invention.

Referring now to FIGURES 2a and 2b, it is seen that 10 generally designates a device in accordance with the present invention. 11 represents a piece of metal such as magnesium which is in contact with an absorbent matrix 12. This may be paper, fiber or porous ceramics. Adjacent the absorbent substance is a glass vial 13 which contains a solution of a suitable electrolyte such as 5% by weight KCl and $H_2O$, an indicator substance such as Brilliant Yellow, and a complexing agent such as ethylene diamine tetraacetic acid (EDTA). The entire system is enclosed in a plastic case 15.

Until the electrolyte contained in vial 13 is released onto the absorbent substance 12 and contact metal 11, no reaction can occur. The device may be activated just prior to placing in contact with the article whose time-temperature history is desired, or it may be activated after placing in contact.

The preferred manner of activating the device of the invention is to mechanically fracture the vial. The liquid entrained in the vial 13 is released onto the absorbent substance and time-temperature integration begins. Of course, the device would be quickly brought to the desirable storage temperature of the article whose time-temperature history is to be sensed.

An alternate method of releasing the electrolyte in vial 13 is to freeze a completely filled vial, thus causing expansion of the electrolyte sufficient to fracture the vial and then thaw the system to allow the electrolyte to wet the absorbent substance 12. However, this method poses certain problems in reliability and the positive mechanical activation is preferred.

While the general description given above includes the indicator substance and complexing agent as being included within the electrolyte in vial 13, it will be apparent that the indicator and complexing agent may also be impregnated into the absorbent substance 12.

During all of the subsequent discussion, it should be recognized that it is generally desirable to have the integration operate in the solid state. That is, the electrolyte should be solid. The various modifications of the invention presented hereinbelow do give time-temperature indication when the electrolyte is in the liquidus; however, the rate of reaction is undesirably fast and complicated by other effects of convection currents and the like.

In operation the device works as follows. As is well known, magnesium and other metals above hydrogen in the Electromotive Series corrode when in contact with an electrolyte and water according to the following equation:

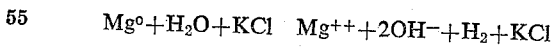

$$Mg^0 + H_2O + KCl \rightarrow Mg^{++} + 2OH^- + H_2 + KCl$$

The magnesium ion will normally combine with the hydroxyl ion to produce the relatively insoluble magnesium hydroxide. This substance is partially soluble and will be sufficiently basic to provide a pH change in an indicator substance, thus providing a moving boundary between unchanged indicator and changed indicator. However, a more satisfactory operation is achieved if the magnesium ion generated by corrosion of the magnesium metal is "tied up" with a complexing agent to prevent the precipitation. While EDTA works particularly well, other complexing agents capable of accomplishing the same results may be used. These other agents will be apparent to those skilled in the art. The metal ion generated by the above reaction may also be used as the indicator by providing a substance in the wick that combines with the metal ion to produce a color. Various "lakes" may be used. In devices where iron is used as the metal, the red-brown color of the hydrated iron oxide provides an indication of the extent of the migration. Other metals producing a colored ion may similarly be used without the use of an indicator.

The operation of the device is now apparent. An electrolyte solution containing an indicator substance having a neutral or slightly acidic pH is in contact with a metal capable of reacting with $H_2O$ in the presence of the salt to corrode and form a metal ion and a hydroxyl ion. The reaction of the metal and the electrolyte continues throughout the indicating period. That is, ions are continually formed at the metal-electrolyte interface. The ions so formed migrate along the absorbent substance to alter the color of the indicator substance (which is pH sensitive) and thus provide a visual indication or the extent of migration or diffusion of the hydroxyl ion. A scale 14 may be superimposed to provide an indication of the quality of the product being stored as a function of the migration of the hydroxyl ion.

The rate of migration of the hydroxyl ion for the magnesium-KCl (5% by weight) system described has been found to be that shown in FIGURE 3. The line represents a given distance of migration. As can be seen, the time required for migration through a given distance is relatively short at temperatures above the freezing point and considerably longer at temperatures below freezing. The general shape of the curve closely approximates that of frozen foods and may be altered by variation of the various elements of the device to match closely that of any frozen food product. For example, a scale may be used which takes into account the variation from food to food. The concentration of the salt also has an effect on the corrosion rate. Other methods of varying the indication will readily suggest themselves to one skilled in the art.

While magnesium has been described in the above example, the metals above hydrogen and below magnesium in the Electromotive Series capable of releasing hydroxyl ions from electrolyte solution may also be used. For example, aluminum, zinc, cadmium and lead show similar results. The closer the metal is to hydrogen in the Electromotive Series, the slower the reaction will be.

Various materials may be used for the electrolyte. Salts of strong acids and strong bases and salts of strong bases and weak acids work particularly well in systems used to provide an indication of frozen food quality. However, the salts of strong acids and weak bases provide an electrolyte which shows a time-temperature dependence, but at a rate of traversal of the indication which is faster for a given temperature than the systems referred to above. The concentration of the salt may be varied over considerable limits and may be usefully used to alter the freezing point of the liquid used as the indicating and diffusion substance. A eutectic mixture of salt and water may be used, and various combinations of salts may be used together. I have also found that acids may be used as the electrolyte. For example, when using aluminum as the metal acetic acid of various concentrations with water may be used as the electrolyte. Test results using concentration of as low as one percent acetic acid and in excess of ten percent acetic acid have shown strong time-temperature dependence. In this type of acid system the metal ion (aluminum) generated during my operation migrates along through the porous member 12. It may be detected, as to its extent of migration, through the use of an indicator substance such as pyrocatechol violet impregnated into the porous member 12. The aluminum ion reacts with the indicator to produce a blue color which is readily observable.

With respect to the various classes of metals, electrolytes and indicators, the following examples are presented as illustrative of the many combinations possible within the scope of the present invention. This list of examples is illustrative only and is not to be considered as complete. Many other combinations will readily suggest themselves to those skilled in the art.

*Example I*

To one liter of water previously saturated with the disodium salt of ethylene diamine tetraacetic acid, there was added 50 grams of potassium chloride. Brilliant yellow indicator was then added to the solution (approximately .05% by weight). A glass capillary tube was filled with this solution and sealed by tipping off the end with a torch. The tube was placed in longitudinal contact with a strip of filter paper which had in contact therewith a thin (.010 inch) strip of magnesium metal. The entire assembly was placed into a transparent plastic envelope of butyl acetate provided with appropriate recesses as indicated in FIGURE 2b. A cover of the same plastic was placed over the device and heat sealed to provide a vapor tight unit.

The glass vial was broken by flexing the plastic case and the entrained liquid was absorbed and distributed throughout the filter paper. Devices prepared in accordance with this example show a time-temperature integration in accordance with FIGURE 3.

*Example II*

The device was prepared in the same manner as Example I with the exception that sodium acetate (1% by weight) was used rather than potassium chloride. This device likewise showed a time-temperature dependence of movement of the boundary produced by the migrating ions generated at the magnesium surface.

*Example III*

This device was prepared in accordance with Example I with the exception that aluminum metal was used and the potassium chloride was replaced by 1% by weight ammonium chloride.

*Example IV*

This device was prepared as in Example I with the exception that aluminum was used as the metal, pyrocatechol violet (a saturated solution) was used as the indicator, and the disodium salt of ethylene diamine tetraacetic acid was 0.1 molar. In this device the aluminum ion was utilized as the migrating ion to be detected. It combined with the pyrocatechol violet to produce a distinct blue color. The indicator proved to be time-temperature dependent.

*Example V*

The general method of preparing the solution as in Example I was used (including complexing agent and indicator) with the exception that instead of using potassium chloride a combination of sodium acetate and sodium tetra meta phosphate was used. The final solution contained 0.1% of sodium acetate and 0.1 mole of sodium tetra meta phosphate. The metal member was aluminum. The rate of movement of the color boundary produced by the migrating ions was time and temperature dependent, although somewhat more rapid than the boundary movement in Example I.

*Example VI*

In this device a solution of equal parts, water and nitric acid, was used as the electrolyte. No indicator or complexing agent was used. Nickel was utilized as the metal member. The nickel ion produced in the reaction (which was green in color) migrated along the wick at a rate proportional to time and temperature.

*Example VII*

In this device iron was utilized as the metal member and equal parts, hydrochloric acid and water, as the electrolyte. A yellow colored reaction product generated at the metal interface migrated across the porous matrix medium at a rate proportional to time and temperature.

Having described the present invention, what I desire to obtain by Letters Patent is:

I claim:

1. A device for visually indicating the extent to which an article has been exposed to a temperature exceeding a predetermined minimum comprising a porous matrix medium containing an electrolyte composition, a single metal body selected from the group above hydrogen in the Electromotive Series in contact with said medium near one end thereof, said electrolyte composition including a substance reducible by said metal body whereby a reaction product is produced capable of changing the color of said matrix medium, said reaction product migrating through said medium to produce said color change at a rate proportional to time and to the increase in temperature above said predetermined minimum.

2. A device for visually indicating the extent to which an article has been exposed to a temperature exceeding a predetermined minimum comprising a porous matrix medium containing an electrolyte composition, a single metal body selected from the group above hydrogen in the Electromotive Series in contact with said medium near one end thereof, said electrolyte containing a quantity of a salt, said composition including a substance reducible by said metal body whereby a reaction product is produced capable of changing the color of said matrix medium, said reaction product migrating through said medium to produce said color change at a rate proportional to time and to the increase in temperature above said predetermined minimum.

3. A device for visually indicating the extent to which an article has been exposed to a temperature exceeding a predetermined minimum comprising a porous matrix medium having a closed frangible vial containing a charge of an electrolyte composition situated adjacent a surface thereof, a single metal body selected from the group above hydrogen in the Electromotive Series in contact with said medium near one end thereof, said electrolyte composition including a substance reducible by said metal body whereby a reaction product is produced capable of changing the color of said matrix medium, said reaction product migrating through said medium to produce said color change at a rate proportional to time and to the increase in temperature above said predetermined minimum.

4. A device for visually indicating the extent to which an article has been exposed to a temperature exceeding a predetermined minimum comprising a porous matrix medium having a closed frangible vial containing a charge of an electrolyte composition situated adjacent a surface thereof, a single metal body selected from the group above hydrogen in the Electromotive Series in contact with said medium near one end thereof, said electrolyte containing a quantity of a salt, said composition including a substance reducible by said metal body whereby a reaction product is produced capable of changing the color of said matrix medium, said reaction product migrating through said medium to produce said color change at a rate proportional to time and to the increase in temperature above said predetermined minimum.

5. A device for visually indicating the extent to which an article has been exposed to a temperature exceeding a predetermined minimum comprising a porous matrix medium containing an electrolyte composition, a single metal body selected from the group above hydrogen in the Electromotive Series in contact with said medium near one end thereof, said electrolyte composition including a substance reducible by said metal body whereby a reaction product is produced, said electrolyte further characterized in that it contains an indicator substance capable of reacting with said reaction product to produce a color change, said reaction product migrating through said medium to produce a color change at a rate proportional to time and to the increase in temperature above said predetermined minimum.

6. A device for visually indicating the extent to which an article has been exposed to a temperature exceeding a predetermined minimum comprising a porous matrix medium containing an electrolyte composition, a single metal body selected from the group above hydrogen in the Electromotive Series in contact with said medium near one end thereof, said electrolyte composition including a substance reducible by said metal body whereby a reaction product is produced, said electrolyte further characterized in that it contains a complexing agent and an indicator substance capable of reacting with said reaction product to produce a color change, said reaction product migrating through said medium at a rate proportional to time and to the increase in temperature above said predetermined minimum.

7. A device in accordance with claim 5 wherein the metal body is magnesium.

8. A device in accordance with claim 5 wherein the metal body is magnesium and the indicator is Brilliant Yellow.

9. A device in accordance with claim 5 wherein the metal body is aluminum and the indicator substance is pyrocatechol violet.

10. A device for visually indicating the extent to which an article has been exposed to a temperature exceeding a predetermined minimum comprising a porous matrix medium containing an electrolyte composition, a single metal body selected from the group above hydrogen in the Electromotive Series in contact with said matrix medium, said electrolyte consisting essentially of an aqueous solution of potassium chloride, Brilliant Yellow indicator, and saturated with the disodium of ethylene diamine tetraacetic acid, said electrolyte reacting with said metal body to produce hydroxyl ions, said hydroxyl ions migrating through said medium to produce a color change at a rate proportional to time and to the increase in temperature above said predetermined minimum.

References Cited in the file of this patent

UNITED STATES PATENTS 2,716,065    Beckett et al. _____ Aug. 23, 1955
3,046,786    Tessem _____ July 31, 1962